United States Patent [19]

Labonville

[11] Patent Number: 5,136,757
[45] Date of Patent: Aug. 11, 1992

[54] RELEASABLE AND ADJUSTABLE FIRE HOSE CLAMP

[76] Inventor: Armand Labonville, 4 Pine St., Gorham, N.H. 03581

[21] Appl. No.: 744,293

[22] Filed: Aug. 13, 1991

[51] Int. Cl.⁵ .............................................. B65D 63/00
[52] U.S. Cl. ........................................ 24/271; 24/270; 24/273
[58] Field of Search ............... 24/271, 270, 273, 280, 24/282, 208, 530, 20 R, 16 R, 23 R

[56] References Cited

U.S. PATENT DOCUMENTS

| | | | |
|---|---|---|---|
| 603,674 | 5/1898 | Arkell | 24/270 |
| 1,073,533 | 9/1913 | Shipp | 24/271 |
| 1,200,601 | 10/1916 | Forslund | 24/273 |
| 2,018,906 | 10/1935 | Winter | 24/271 |
| 2,305,994 | 12/1942 | Richards | 24/271 |
| 2,775,806 | 1/1957 | Love | 24/271 |
| 2,882,071 | 4/1959 | Klompar | 24/271 |
| 4,470,177 | 9/1984 | Ganung et al. | 24/273 |
| 4,511,164 | 4/1985 | Orchard | 24/270 |

FOREIGN PATENT DOCUMENTS

| | | | |
|---|---|---|---|
| 1296426 | 5/1962 | France | 24/271 |
| 0835005 | 5/1960 | United Kingdom | 24/270 |
| 0954388 | 4/1964 | United Kingdom | 24/271 |

*Primary Examiner*—Victor N. Sakran
*Attorney, Agent, or Firm*—Samuels, Gauthier & Stevens

[57] ABSTRACT

A fire hose clamp has two flexible straps permanently connected at their upper ends by a pivotal lever and detachably connected at their lower ends by means of a pawl and ratchet assembly.

5 Claims, 2 Drawing Sheets

RELEASABLE AND ADJUSTABLE FIRE HOSE CLAMP

BACKGROUND OF THE INVENTION

1. Field of the Invention

This invention relates generally to firefighting equipment, and is concerned in particular with an improved clamp for releasably and adjustably gripping fire hoses. The clamp of the present invention is especially suited for use as part of a harness or sling to be worn by fireman.

2. Description of the Prior Art

When operating at typical water pressures of 50-100 lbs, fire hoses are extremely hard to handle. They are heavy, stiff, slippery and difficult to grip. Often, two or three fireman must join efforts in supporting and controlling the hoses, with the lead or nozzle man being particularly stressed. These problems are further compounded when the hoses must be carried or pulled up stairwells or ladders, where fireman are frequently unable to keep both hands on the hose.

SUMMARY OF THE INVENTION

The present invention has as its primary objective the provision of a hose clamp that can be employed as part of a sling or harness by a fireman to assist him in carrying the hose and in supporting the hose during use in fighting a fire.

The clamp of the present invention is readily adjustable to accommodate a wide range of hose sizes.

The clamp of the present invention further embodies a quick release mechanism which enables a fireman to quickly disengage himself from the hose in an emergency situation.

These and other object and advantages of the present invention will become more apparent as the description proceeds with reference to the accompanying drawings wherein:

DETAILED DESCRIPTION OF ILLUSTRATED EMBODIMENT

Figure 1:
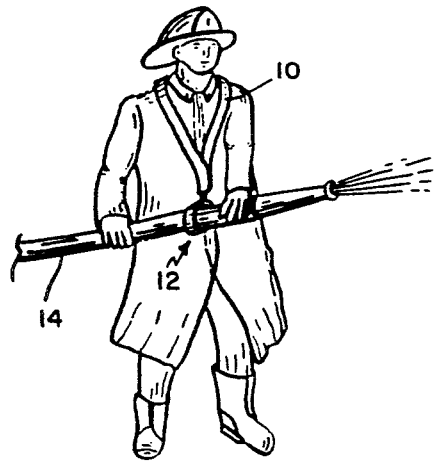
FIG. 1 is an illustration of a fireman employing a harness to support a fire hose. The harness includes a clamp in accordance with the present invention.

Referring initially to FIG. 1, a fireman is shown wearing a sling or harness 10 having a hose clamp 12 in accordance with the present invention secured to a fire hose 14.

With reference to the remainder of the drawings, it will be seen that the clamp 12 includes flexible first and second straps 16,18. The first strap 16 is configured and dimensioned to partially encircle the hose 14. The second strap 18 is configured and dimensioned to coact with the first strap to complete the encirclement of the hose.

Figure 2:
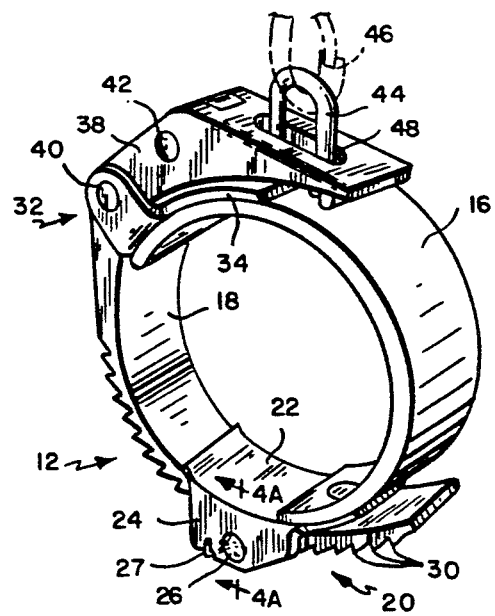
FIG. 2 is a perspective view of the clamp of the present invention.
Figure 3:
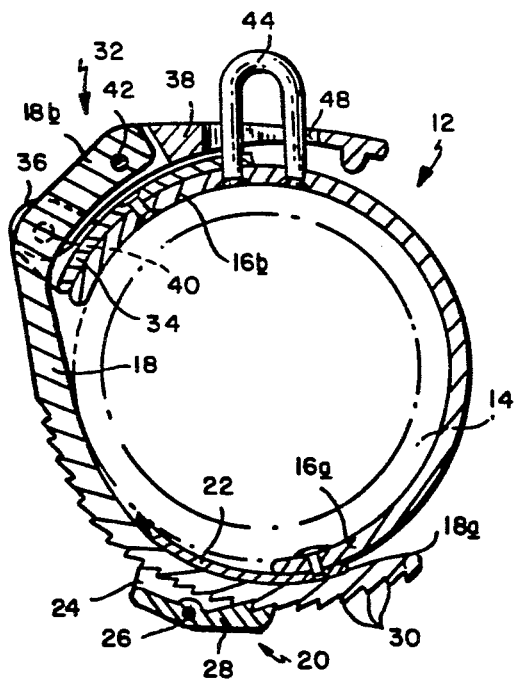
FIG. 3 is a cross sectional view of the clamp.
Figure 4:
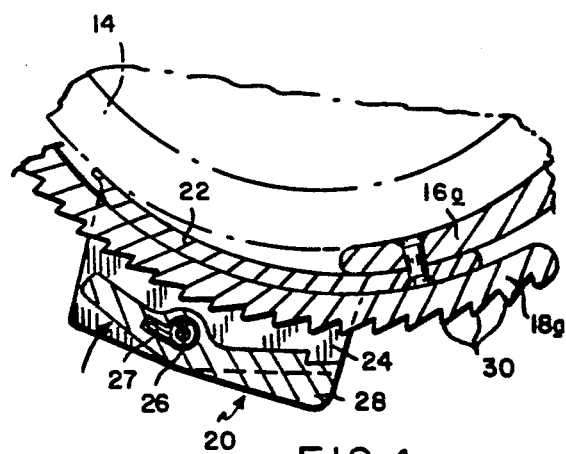
FIG. 4 is a partial cross sectional view, on an enlarged scale, of the lower portion of the clamp showing the pawl in its release position.
Figure 4A:
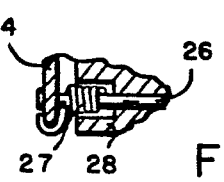
FIG. 4A is a partial sectional view taken on line 4A-4A of FIG. 2.

The lower portion 16a of strap 16 is partially overlapped by the lower portion 18a of the second strap 18. A first connecting means generally indicated at 20 releasably interconnects the lower strap portions. Connecting means 20 includes a buckle 22 secured to the lower strap portion 16a. The buckle includes mutually spaced confronting sides 24 between which is received the lower strap portion 18a. A pin 26 bridges the gap between the sides 24. A pawl 28 is mounted on the pin 26 and is spring loaded by spring 27 for pivotal movement between a closed position engaging ratchet teeth 30 on the exterior surface of strap 18, as shown in FIGS. 2 and 3, and a release position disengaged from the ratchet teeth, as shown in FIG. 4.

A second connecting means generally indicated at 32 permanently interconnects the upper strap portions 16b, 18b. The second connecting means includes a bracket 34 fixed to the upper strap portion 16b. The bracket has mutually spaced ears 36. A lever 38 is pivotally connected at one end as at 40 between the ears 36, and an intermediate portion of the lever is pivotally connected as at 42 to the upper portion 18b of strap 18.

A support member 44 protrudes upwardly from and cooperates with the upper strap portion 16b to define an eye in which the snap hook 46 of the sling or support harness 10 can be releasably engaged. The lever 38 has an aperture 48 through which the support member protrudes when the lever is closed.

Figure 6:
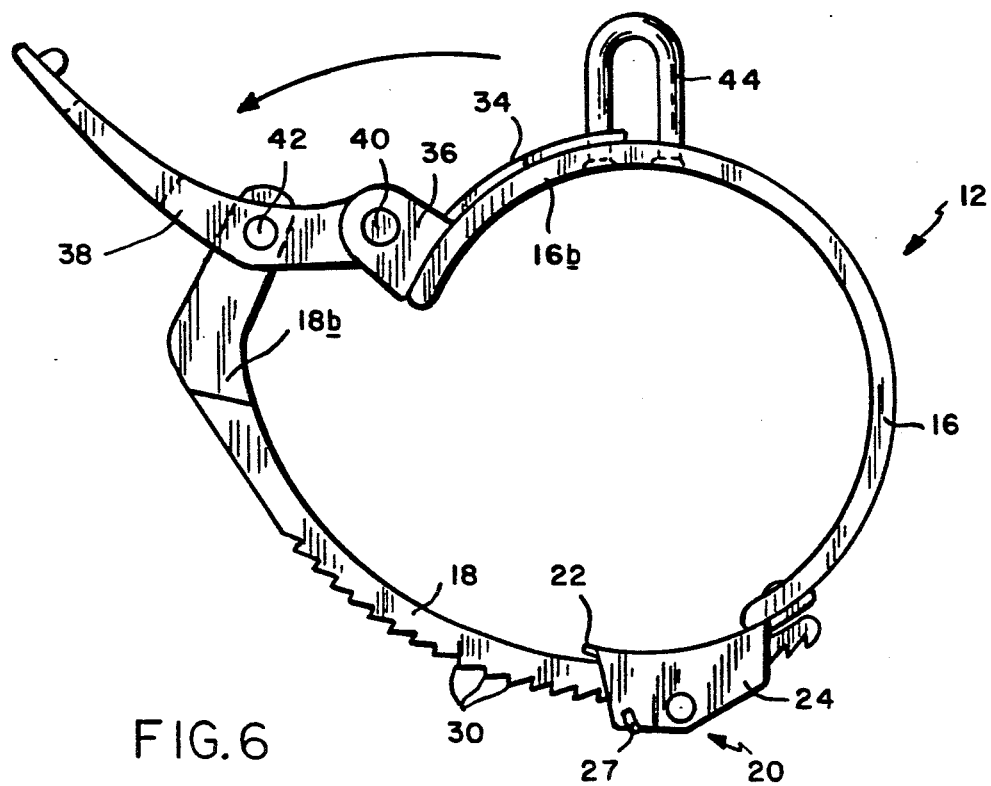
FIG. 6 is another end view showing the operating lever in its open position preparatory to sliding the clamp onto the end of a hose.

When applying the clamp to a hose, the lever 38 is first opened as illustrated in FIG. 6. The upper strap portions 16b, 18b are thus held in spaced apart relationship, thereby enlarging the hose opening and allowing the clamp to be easily slipped over the hose end. The lever is then closed, as shown in FIG. 2 and 3, thereby bringing the strap portions 16b, 18b into an overlapped relationship, and tightly clamping the straps around the hose. When the lever is closed, the support member 44 protrudes through the lever opening 48. Then, once the strap hook 46 is engaged, the lever 38 is securely retained in its closed position.

The clamp can be tightened around smaller hoses by simply advancing the lower strap portion 18a over the lower strap portion 16a. The ratchet teeth 30 will pass beneath the spring loaded pawl 28 during such advancement, but will prevent retraction of strap portion 18a in the opposite direction.

Figure 5:
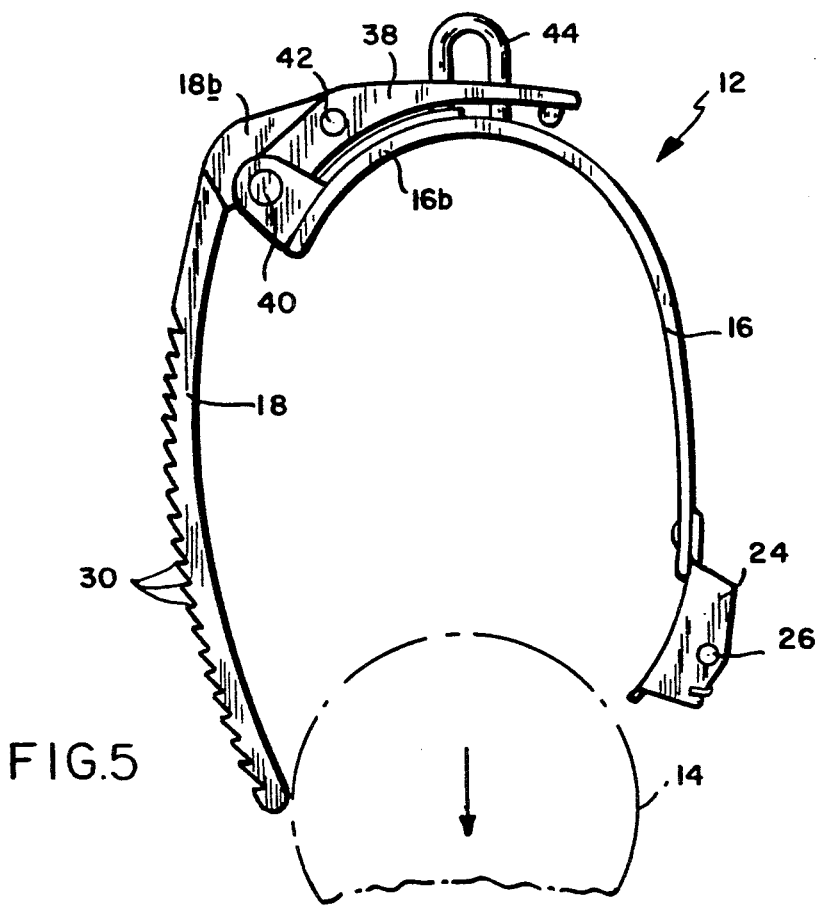
FIG. 5 is an end view showing the clamp in the process of being disengaged from the hose, for example during an emergency situation.

Should it become necessary to quickly disengage the clamp from the hose during an emergency situation, one need only release the pawl 28 from the ratchet teeth 30. The lower strap ends 16a, 18a will thus separate one from the other, as shown in FIG. 5, and the hose will simply drop away.

I claim:

1. A fire hose clamp comprising:
   a flexible first strap configured and dimensioned to partially encircle a fire hose, said first strap having upper and lower portions;
   a flexible second strap configured and dimensioned to coact in overlapping relationship with said first strap to complete the encirclement of said hose, said second strap having an upper portion and a lower portion with a series of ratchet teeth located thereon;

first connecting means for releasably interconnecting the lower portions of said first and second straps, said first connecting means including a pawl pivotally carried on the lower portion of said first strap, said pawl being adjustable between an engaged position coacting with the ratch teeth on the lower portion of said strap to interconnect the lower portions of said first and second straps, and a release position at which said pawl is disengaged from said teeth to thereby allow the lower portions of said straps to move apart; and second connecting means for permanently interconnecting the upper portions of said first and second straps, said second connecting means including a lever pivotally connected at one end thereof to the upper portion of said first strap and at an intermediate portion thereof to the upper portion of said second strap, said lever being pivotally adjustable between an open position at which the upper portions of said first and second straps are held in spaced apart relationship, and a closed position at which the upper portion of said second strap overlaps the upper portions of said first strap.

2. The fire hose clamp of claim 1 further comprising a support member protruding upwardly from and cooperating with the upper portion of said first strap to define an eye in which the snap hook of support harness may be engaged.

3. The fire hose clamp of claim 2 wherein said support member comprises an inverted u-shaped element.

4. The fire hose clamp of claim 2 wherein said lever has an aperture through which said support member protrudes vertically when said lever is in said closed position.

5. The fire hose clamp of claim 1 further comprising means for resiliently biasing said pawl into said engaged position.

* * * * *